(12) United States Patent
Jayaraman

(10) Patent No.: US 11,954,082 B1
(45) Date of Patent: Apr. 9, 2024

(54) USER DEFINABLE ALTERNATE DISPLAY OF LOG ENTRIES

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/149,456

(22) Filed: Jan. 3, 2023

(51) Int. Cl.
G06F 16/21 (2019.01)
G06F 3/0481 (2022.01)
H04N 21/47 (2011.01)

(52) U.S. Cl.
CPC .......... *G06F 16/219* (2019.01); *G06F 3/0481* (2013.01); *H04N 21/47* (2013.01)

(58) Field of Classification Search
None
See application file for complete search history.

(56) References Cited

U.S. PATENT DOCUMENTS

| | | | | |
|---|---|---|---|---|
| 10,528,838 | B1 * | 1/2020 | Carter, Jr. | G06F 16/90 |
| 2003/0110129 | A1 * | 6/2003 | Frazier | G06F 16/25 |
| 2004/0019853 | A1 * | 1/2004 | Takizawa | G06F 16/23 |
| 2007/0118399 | A1 * | 5/2007 | Avinash | G06F 16/21 |
| 2015/0248725 | A1 * | 9/2015 | Holtzman | G06F 16/116 |
| 2016/0098692 | A1 * | 4/2016 | Johnson | G06F 16/21 |
| 2021/0248599 | A1 * | 8/2021 | Praszczalek | G06F 16/219 |
| 2023/0195932 | A1 * | 6/2023 | Carnesecca | G06F 16/21 |
| 2023/0334164 | A1 * | 10/2023 | Oikawa | G06F 16/338 |

* cited by examiner

*Primary Examiner* — Son T Hoang
(74) *Attorney, Agent, or Firm* — Michael A. Springs, Esq.; Shumaker, Loop & Kendrick, LLP; Patrick B. Horne

(57) ABSTRACT

A method and system for enabling a user to hide or rename an item in a list of items. The user identifies an item or a set of related items and then designates whether to hide or rename the item(s). The hiding or renaming can be applied to printed lists or to lists displayed in online systems, or both. Various options exist for footnoting the hidden or renamed item, and for compensating for hidden items in printed lists. Original item data including date, description and other information are always retained in the database.

16 Claims, 7 Drawing Sheets

JOHN A. SMITH    ACCOUNT # 4321 8888 7654 1234    STATEMENT PERIOD JUNE 16 – JULY 15, 2022

TRANSACTIONS

| Transaction Date (270) | Posting Date (272) | Description (274) | Reference Number (276) | Amount (278) |
|---|---|---|---|---|
| 06/15 | 06/16 | PETES PIZZA    EDINBURGH (280) | 7149 | $26.54 |
| 06/17 | 06/19 | LNER    039756623 (282) | 1609 | $44.17 |
| 06/20 | 06/22 | Bagel Shoppe    London | 6130 | $8.47 |
| 06/21 | 06/22 | THE BAR    WINDSOR (284) | 1044 | $57.65 |
| ... | ... | ... ... ...    ... | ... | .... |
| 07/07 | 07/09 | GELATERIA    SORRENTO (286) | 3501 | $14.81 |
| 07/10 | 07/12 | Gram.Caffe GRAMOLL    Napoli | 7149 | $20.39 |
| 07/11 | 07/14 | VITO'S VINOS    ROMA (288) | 2828 | $100.22 |
| ... | ... | ... ... ...    ... | ... | .... |

TOTAL    $1,763.55

JOHN A. SMITH    ACCOUNT # 4321 8888 7654 1234    STATEMENT PERIOD JUNE 16 – JULY 15, 2022

TRANSACTIONS

| Transaction Date | Posting Date | Description | Reference Number | Amount |
|---|---|---|---|---|
| 06/15 | 06/16 | PETES PIZZA    EDINBURGH | 7149 | $26.54 |
| 06/17 | 06/19 | TRAIN TIX TO LONDON | 1609 | $44.17 |
| 06/20 | 06/22 | Bagel Shoppe    London | 6130 | $8.47 |
| ... | ... | ... ... ... | ... | ... |
| 07/07 | 07/09 | GELATERIA    SORRENTO | 3501 | $14.81 |
| 07/10 | 07/12 | Gram.Caffe GRAMOLL    Napoli | 7149 | $20.39 |
| 07/11 | 07/14 | VITO'S CUCINA    ROMA | 2828 | $100.22 |
| ... | ... | ... ... ... ... | ... | ... |
|  |  | Other Transactions |  | $57.65 |
|  |  |  | TOTAL | $1,763.55 |

FIG. 5

USER DEFINABLE ALTERNATE DISPLAY OF LOG ENTRIES

FIELD

The present disclosure relates generally to the field of digital banking systems, and more particularly to a method and system for enabling a customer to hide or rename a transaction in a statement or in an online banking transaction list, where the customer can hide or rename individual transactions or groups of transactions, and can restore the display of hidden transactions and restore the original description of renamed transactions via an option in the system.

BACKGROUND

Digital banking systems are well known and used by many bank businesses and their customers. Two common types of digital banking systems are online web-based systems which interact with a user via a web browser window on a computer, and mobile applications ("apps") which run on mobile devices such as smart phones and tablets. Both online web-based banking systems and mobile banking apps communicate with back-end servers which validate and execute specific transactions, provide data for display, etc. Both web-based and mobile app-based systems also include security and customer authentication features, where user-provided information and/or biometric information is collected from the customer and validated with data stored on the back-end server. Digital banking systems, including web-based and mobile app-based systems, are often referred to as online banking systems, which terms will be used interchangeably throughout the present disclosure.

Each customer has one or more accounts with the bank, which the customer may access and manage. The accounts might include checking and/or savings accounts, credit cards, and possibly investment accounts or others. Customers typically receive periodic statements for each account—such as a monthly credit card statement—in which every transaction is listed (deposits, withdrawals, purchases, payments, etc.) and a new account balance is shown. This practice is well known, where the historically paper statements have been switched to electronic documents in some cases.

Customers who use a bank's digital banking systems also have access to near-real-time account information, where transactions are posted to the account ledger soon after the transaction's occurrence. For example, a credit card purchase at a coffee shop will often appear in the online transaction list for the credit card account within minutes of the purchase. This allows savvy online banking customers to regularly review their transaction list (e.g., to spot potential fraud) and also to keep track of their current account balance. These online transaction lists directly access data from a transaction database, and may be updated many times each day. By contrast, the account statements (described above) are produced only at the close of a statement period—such as monthly.

Each transaction on an account statement or in an online account transaction list includes a date and an amount of the transaction, along with information about the payer or payee. For example, in the case of the purchase at the coffee shop, the name of the shop and often the location of the shop (e.g., city) will be displayed along with the date and the purchase amount. Other transaction information is also sometimes displayed—such as a transaction ID number, an indication of how the purchase was made (online or in-person) and/or a brief description of the purchase.

There may be occasions where two or more people share bank accounts and a first person (e.g., one family member) does not want a second person (e.g., another family member) to know the nature of some purchases that the first person has made. This would be the case, for example, if a husband makes a jewelry purchase as a gift for his wife and he does not want her to see the jewelry store purchase transaction on their credit card statement. Many other such circumstances may be envisioned. There may also be occasions where the name of a retailer is abbreviated in a very cryptic manner in the transaction list, and the customer wants that retailer to always be displayed in a more understandable format.

In view of the circumstances described above, there is a need for an online banking system feature where transactions in statements and online account lists can be hidden or customized to suit a customer's preference.

BRIEF SUMMARY

The present disclosure describes a method and system for enabling a customer to hide or rename a transaction in a statement or in an online banking transaction list. Using features of a web-based or app-based digital banking system, the customer identifies a transaction or a set of related transactions and then designates whether to hide or rename the transaction(s). The hiding or renaming can be applied to periodic account statements or to transaction lists displayed in online banking, or both. Various options exist for footnoting the hidden or renamed transaction, and for accounting for the monetary amount of hidden transactions in account statements. Original transaction data including date, merchant info and monetary amount are always retained in the bank's database. The online banking user profile which requested the hiding or renaming can reinstate the display of the transaction at any time using online banking.

The features, functions, and advantages that have been discussed may be achieved independently in various embodiments of the present disclosure or may be combined in yet other embodiments, further details of which can be seen with reference to the following description and drawings, along with the appended claims.

BRIEF DESCRIPTION OF THE DRAWINGS

Figure 1:
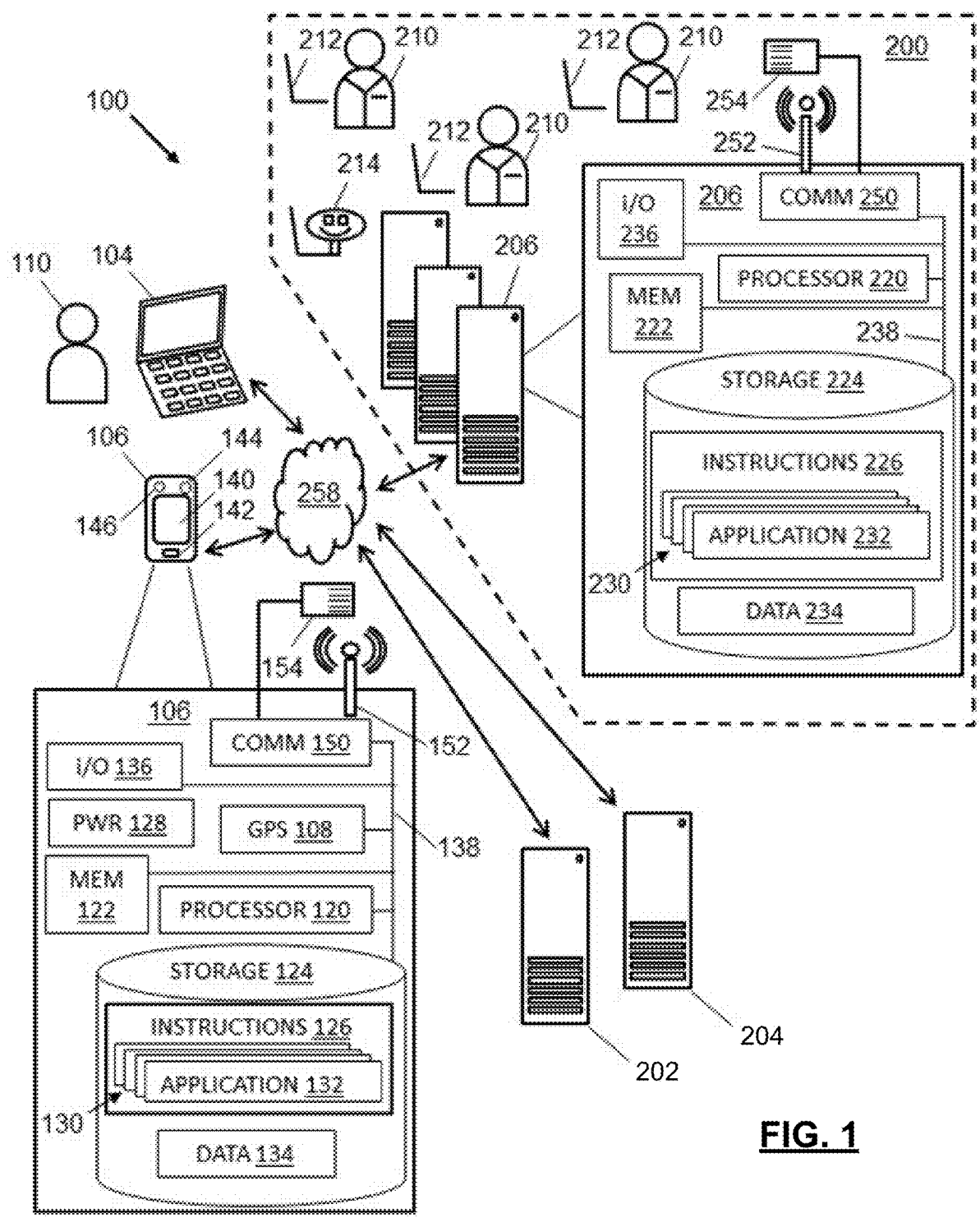
Figure 3:
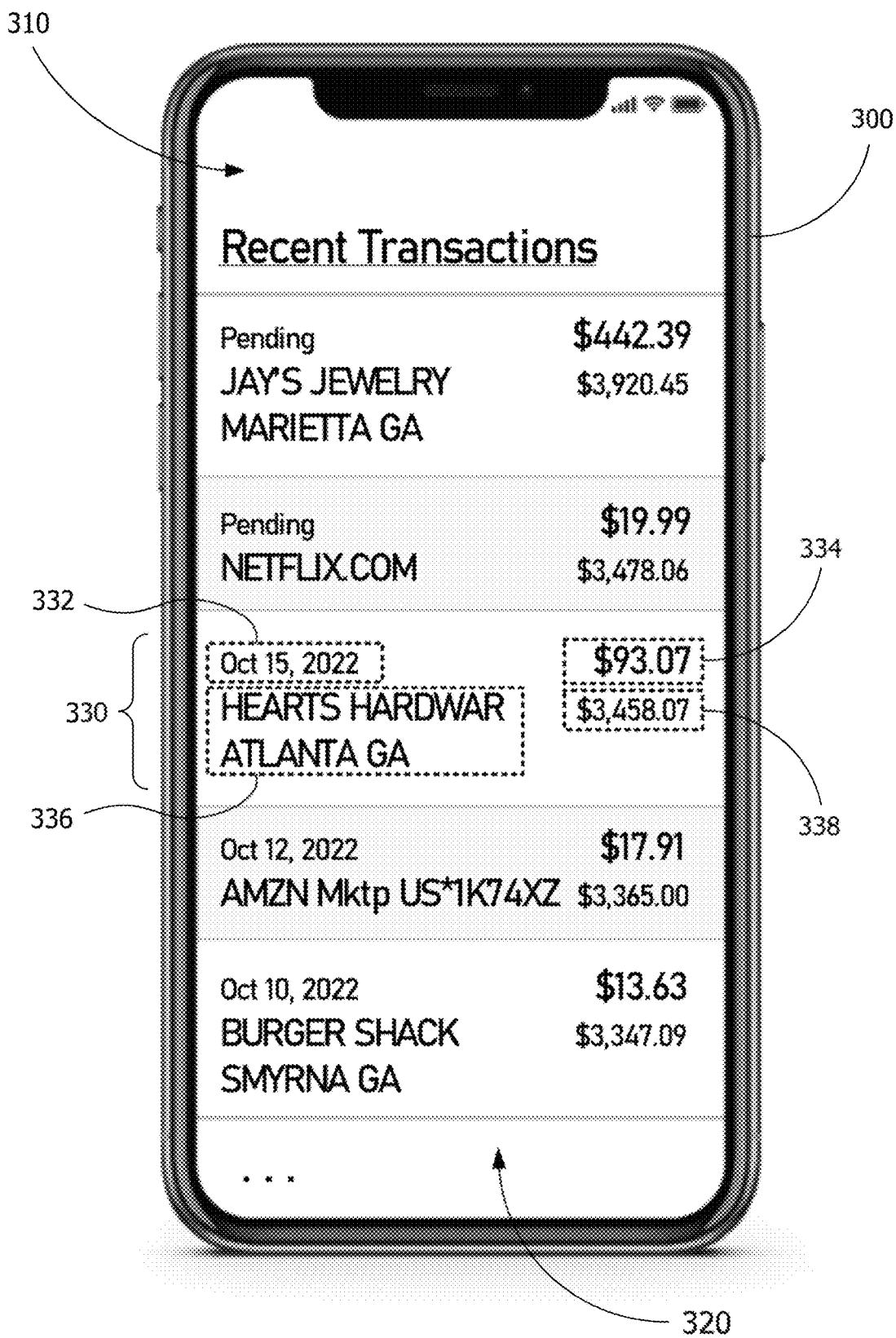
Figure 4:
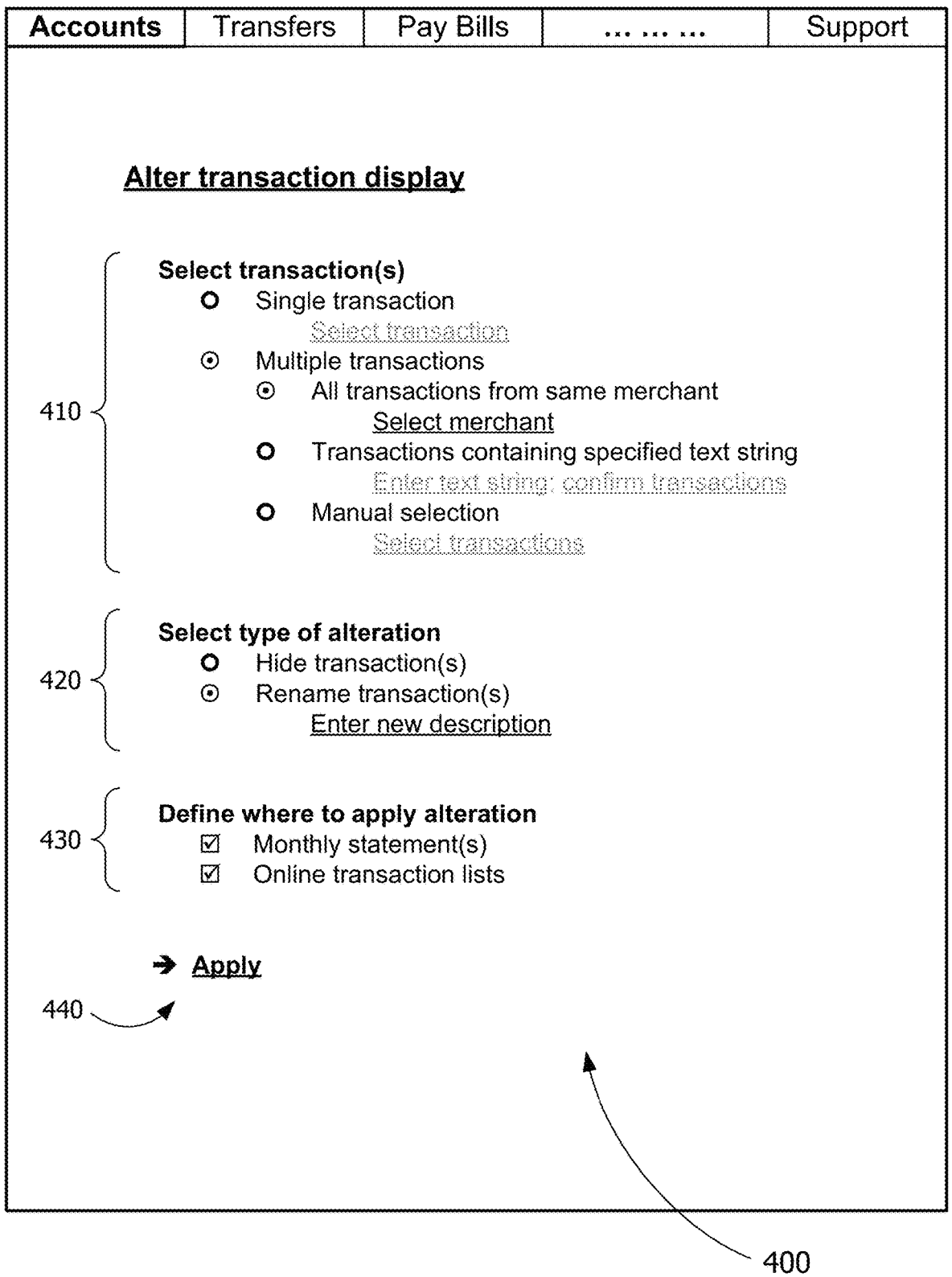
Figure 6:
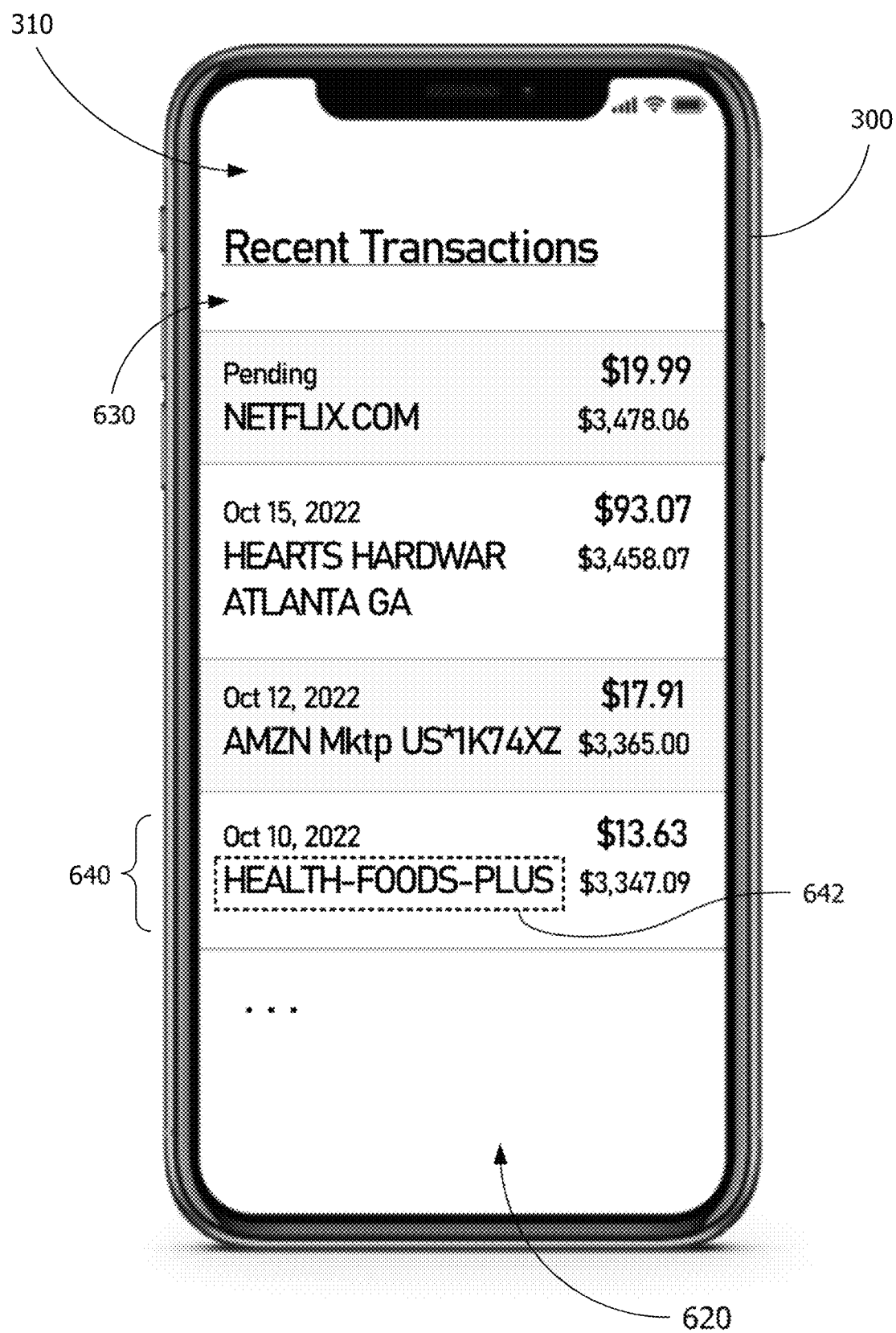
Figure 7:
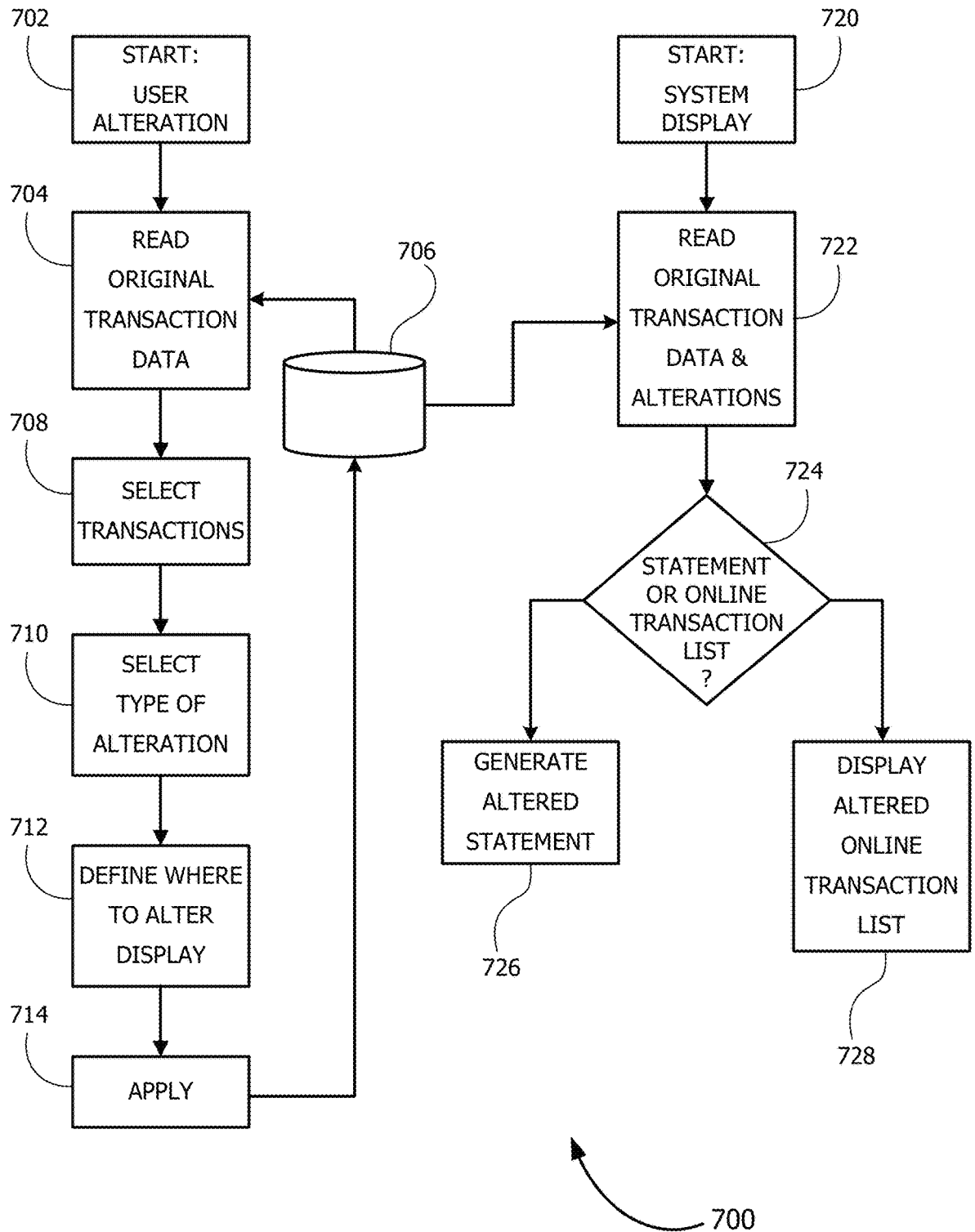

Having thus described embodiments of the invention in general terms, reference will now be made to the accompanying drawings, wherein:

FIG. 1 illustrates an enterprise system, and environment thereof, including a centralized server system, distributed computers and mobile devices, and communication therebetween, according to at least one embodiment of the present disclosure;

FIG. 2 is a mock-up illustration of a transaction list portion of a monthly statement that a customer might receive for an account such as a credit card, as known in the art;

FIG. 3 is a mock-up illustration of a display screen of a mobile device running a digital banking application, depicting a transaction list portion of an account page, as known in the art;

FIG. 4 is a mock-up illustration of a digital banking application running in a web browser window on a computer, depicting an interaction with a user defining criteria for altering the display of one or more transactions on statements or online transaction lists, according to an embodiment of the present disclosure;

FIG. 5 is a mock-up illustration of a transaction list portion of a monthly statement similar to that shown in FIG. 2, where transactions have been hidden and renamed on the statement, according to an embodiment of the present disclosure;

FIG. 6 is a mock-up illustration of a mobile device depicting a transaction list portion of an account page similar to that shown in FIG. 3, where transactions have been hidden and renamed in the online transaction list, according to an embodiment of the present disclosure; and FIG. 7 is a flowchart diagram of a method for altering the display of transactions in a transaction list, according to an embodiment of the present disclosure.

DETAILED DESCRIPTION OF EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, including centralized and distributed computing devices, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing.

Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

Having described an enterprise computing environment as might be used by a banking business, and general characteristics of systems which may be employed in the enterprise computing environment, attention is now turned to the topic of hiding or customizing transactions in connection with digital banking.

Digital banking systems are well known and used by many bank businesses and their customers, including online web-based systems which interact with a user via a web browser window, and mobile applications ("apps") which run on mobile devices such as tablets and smart phones. Both online web-based banking systems and mobile banking apps communicate with back-end servers which validate and execute specific transactions, provide data for display, etc.

Banking customers have at least one account, and often more than one account with a bank business. These accounts may include savings accounts, checking accounts, credit cards, etc. Customers receive a statement for each account, typically once per month. The statement lists a beginning balance, all transactions for the statement period, and an ending balance, among other things. Online banking systems also provide customers with access to near-real-time transaction lists for each account, where transactions appear in the online system as soon as they are posted to the bank's back end database; these will be referred to herein as online transaction lists.

Customers sometimes have a need to prevent a particular transaction from being revealed to another person—in a statement or in an online transaction list, or both. Customers may also desire to have certain transactions or groups of transactions displayed differently or more clearly in statements and online transaction lists. Both of these customer requirements are addressed in the techniques of the present disclosure.

One use case for hiding or renaming a transaction is where one person (e.g., a husband) wants to prevent another person who shares the same account (e.g., a wife) from becoming aware of a certain purchase. This would be the case when the purchase is a gift and the husband doesn't want the wife to see the purchase transaction in a statement or an online transaction list before the gift is given. This could be accomplished either by hiding the transaction completely (i.e., eliminating the transaction from the statement and/or online transaction lists), or by allowing the husband to rename the transaction (i.e., change the description to something generic that does not give away the nature of the purchase). Many other similar scenarios may be envisioned where one party in an account desires to hide or rename a transaction to prevent another party in the account from learning about the transaction.

Another use case for renaming transactions is where transactions appear with obscure names or abbreviations which are difficult for the customer to understand or remember. For example, a customer notices that purchases she makes at her favorite coffee shop appear on her credit card transaction list as "CORCOF89", and the customer would prefer to see them listed with the actual name of the coffee shop which is "Cora's Coffee". In this case, the customer may want to change all occurrences of "CORCOF89" to "Cora's Coffee"—in current and future statements and online transaction lists. Again, many other scenarios may be envisioned where a customer desires to rename transactions in order to more readily understand or remember them. Implementation details of the hiding and renaming features in the digital banking systems are discussed below.

FIG. 2 is a mock-up illustration of a transaction list portion of a monthly statement 260 that a customer might receive for an account such as a credit card, as known in the art. The statement 260 illustrated in FIG. 2 could be a paper statement which is mailed to the customer, or an electronic document which is viewed in a digital banking system or transmitted (e.g., by downloading or by email) to the customer's computing device. Furthermore, the statement 260 could be for a credit card account, checking account (with or without a debit card), a savings account or any other type of account. In any case, the document is typically viewed in a page-type format. Thus, the statement 260 of FIG. 2 appears as a page.

At the top of the page, information about the account to which the statement refers is provided—including the accountholder's name, an account number, and a statement period (beginning and ending dates). The statement 260 would typically have a first page listing general information about the account for the statement period—including beginning and ending balances, and a payment due date in the case of a credit card. Also contained in the statement 260, typically beginning on a second or third page, is a list of transactions occurring during the statement period. This list of transactions is what is depicted in FIG. 2.

The transaction list on the statement 260 is shown as having five columns—a transaction date column 270, a posting date column 272, a transaction description column 274, a reference number column 276 and a transaction amount column 278. It is to be understood that the statement 260 may have more or fewer columns, different arrangements of columns, etc., without affecting the scope of the current discussion—which is directed primarily to the transaction description column 274 and secondarily to the transaction amount column 278.

As would be understood by anyone familiar with bank account statements and credit card statements, the entries in the transaction description column 274 may have a wide variety of formats. On credit card and debit card (check account) statements particularly, the transaction description typically lists the name of the merchant where the purchase was made and oftentimes lists a location such as a city. Sometimes the city is omitted and other information is added. Abbreviations, mixed upper- and lower-case text and numbers may be included in the transaction descriptions. A few examples of these variations in transaction description are illustrated in FIG. 2 and are discussed below.

A transaction description 280 is a typical description which is easy to understand, listing the full name of an establishment and a city. A description 282 is just the opposite, listing an abbreviated name of a merchant and a number which in this case is a ticket number. Some customers may look at the description 282 and not remember what "LNER" is, and think that this is a fraudulent charge. A description 284 is simple and easy to understand, although both the name of the establishment and the city may be ambiguous. A description 286 includes abbreviations and partial duplication of a name, upper and lower case characters and an apparent truncation of part of the name; this renders the description 286 difficult to read. A transaction description 288 is another typical description listing the full name of an establishment and a city.

The transaction list on the statement 260 ends with a total amount of the transactions, which is used in the calculation of the ending balance mentioned above. The total shown on the statement 260 is not intended to be the sum of the seven transactions listed; many other transactions have been omitted, as indicated by the rows of ellipses.

The statement 260 is simply a general illustration of any statement that a banking customer might receive—whether in printed or electronic form. The statement 260 of FIG. 2 is provided as a basis for the later discussion of the techniques of the present disclosure—where the display of some of the transactions from the statement 260 is altered to suit a customer's preference.

FIG. 3 is a mock-up illustration of a mobile device 300 running a digital banking application, depicting a transaction list portion of an account page, as known in the art. The mobile device 300 of FIG. 3 corresponds with the device 106 of FIG. 1, and it is to be understood that the mobile device 300 communicates with a back-end server such as the computing system 206 of FIG. 1, by way of communications channels such as WiFi and/or cellular communication networks as illustrated by the network 258 ("the cloud") of FIG. 1.

The mobile device 300 has a display screen 310 which serves as an input/output (I/O) device and user interface for user interaction with applications (apps) which run on the device 300. In FIG. 3, a simplified mock-up of a digital banking app is shown. On the screen depicted in FIG. 3, a transaction list 320 is displayed. These are recent transactions which have been performed in an account that is currently being viewed in the digital banking app. The customer can scroll up or down to view other transactions, as indicated by the ellipsis.

The transaction list 320 shown in FIG. 3 is illustrated as being displayed on a mobile device, particularly a smart phone. However, it is to be understood that the same information could be displayed in a transaction list on a web-based digital banking system, where the customer uses a computer with web browser software and the account information is displayed in a web browser window. The online transaction list 320 as shown in FIG. 3—whether on a computer (web-based) or on a mobile device (app-based)—differs from the statement 260 of FIG. 2 in that the online transaction list 320 is update with new information (new transactions, and changes in transaction status) in near real time, whereas statements are documents which are generated on a periodic basis such as once per month. Both statements and online transaction lists draw their information from a master data source—a database of transactions which is managed by the banking business.

The transaction list 320 shows five transactions, including a transaction 330 which is discussed as representative. The transaction 330 includes a date in box 332, which may correspond with the posting date on the statement 260 of FIG. 2. For very recent transactions which have not been fully completed and validated, the word "Pending" may be displayed instead of a date. A transaction amount (e.g., amount of purchase) is shown in box 334. A transaction description is shown in box 336; this is the information which was shown in the transaction description column 274 and discussed above in connection with FIG. 2. A new account balance is shown in box 338; this is the new balance of the account including the transaction amount which appears above it in the box 334. Because the transaction list 320 of FIG. 3 is intended to depict a credit card account, the new account balance gets higher with each new purchase (going up the list).

The transaction list 320 may appear differently if viewed in a web-based digital banking system rather than an app-based system. The transaction list 320 may also be formatted differently than shown in FIG. 3, and may include somewhat different data elements, without affecting the following discussion. Again, the transaction list 320 is simply a general illustration of an online transaction list that a customer might view, and is provided as a basis for the later discussion of the techniques of the present disclosure—where the display of some of the transactions is altered to suit a customer's preference.

Pursuant to the foregoing discussion of the transactions included in the statement 260 and the online transaction list 320, many different scenarios may be envisioned where a customer wants to alter the display of a transaction. That is the subject of the techniques of the present disclosure. In some cases, a customer may want to hide a transaction completely—that is, eliminate it from the transaction list. In other cases, the customer may want to rename a transaction so that the description is something more to the customer's liking.

In one scenario, the altering of a transaction display can be applied to a single, individual transaction. For example, the customer may want to hide or rename a purchase from a jewelry store or a flower shop so that a spouse does not become aware of gifts which were purchased but not yet given.

In another scenario, all purchases from a particular merchant can be hidden or renamed. For example, the customer may want to hide or rename all purchases from a certain fast food chain to prevent the spouse from knowing that he is "cheating" on his diet. As another example, a particular retailer may have an unrecognizable name in the transaction list (e.g., "RK Enterprises"), and a customer may want to always rename purchases at that establishment as "Speedy Gas Station".

Multiple different retailers can also be given the same pseudonym (altered description). For example, several different franchises of the same national coffee chain (which might have different store numbers in their description) could all be called just "Coffee". Other coffee shops could also be given the same pseudonym "Coffee". Additionally, a rule could be created where any merchant with the text "coffee" in the merchant name is automatically given the pseudonym "Coffee". Such rules can be changed or revoked at any time, as can any of the altered transaction display configurations applied by the customer. Whenever altered display rules are applied to all purchases from a certain merchant, or a group of merchants, the altered display applies to current and future transactions—that is, those transactions currently in the account transaction list and future transactions which are made with the identified merchants.

The altered display of transactions (e.g., hidden, or renamed description) can be applied in online transaction lists, or statements, or both. For example, if a customer knows that her husband views the statements which arrive in the mail but he doesn't use online banking, she may dictate that certain transactions are hidden or renamed in statements only.

When two or more people have joint access to an account, and each person has his/her own online banking profile (login ID and password), it is also possible for one such online banking user to alter the display of transactions in online transaction lists for the other online banking user ID. In one embodiment, in online transaction lists or statements, a type of flag (* or t) could be displayed next to a transaction to indicate that the transaction's display has been altered.

In statements on which some transactions are hidden, the purchase amounts of the hidden transactions must always be included. This is so that the total amount of purchases in the transaction list on the statement is correct, which is necessary in order for the ending balance to be computed properly. In this case, hidden transactions may be lumped together as a line item labelled "other" or something similar.

Original transaction data (including description and all other data fields) is always maintained by the bank business in the master transaction database. The customer request to hide or rename transactions is data which is kept in additional fields of the database (transaction attributes). The alteration-related transaction attributes are used by the statement generation algorithm when creating a statement, or the digital banking systems when displaying online transaction lists.

FIG. 4 is a mock-up illustration of a digital banking application running in a web browser window on a computer, depicting an interaction with a user defining criteria for altering the display of one or more transactions on statements or online transaction lists, according to an embodiment of the present disclosure. The computer on which the web browser is running in FIG. 4 corresponds with the computing device 104 of FIG. 1, and is in communication with the computing system 206 (the enterprise server). A web page 400 depicts one embodiment of a user interaction dialog, which will be explained below in detail. It is to be understood that the selections and prompts could be worded differently, or ordered differently on the page 400, without affecting the scope of the technique.

It is also to be understood that a similar set of selections and prompts—for a user to define criteria for altering transaction display—would be available in a mobile banking app (accessed on a smart phone, for example). In the case of a mobile app, rather than displaying all of the selections and prompts on a single page as on the web page 400, a series of screens or pages may be used—such as one screen for selecting transactions, a next screen for selecting the type of alteration, etc. Again, these implementation details are merely matters of user interface design, and do not affect the scope of the presently disclosed methods.

At the top of the web page 400 is a set of "tabs" (Accounts, Transfers, Pay Bills, etc.) as commonly used in web application design. In the scenario of FIG. 4, the user has of course logged into the system, and then selected the Accounts tab. The user would then have selected one particular account, and then clicked on an option or command for altering the display of transactions, leading to the web page 400 as shown on FIG. 4.

The various descriptions, options, selections and prompts on the web page 400 follow a standard web application protocol—including the use of radio buttons, checkboxes and underlined selectable items. According to recognized protocols, radio buttons allow only one item from a list to be selected, and if the radio button for one item is selected, all other radio buttons at that list level will be unselected. Checkboxes are used where more than one item may be selected, in a known fashion. Underlined text indicates a selection that may be made by the user, which often will take the user to a different page to provide more input (selecting items from a list, or entering text, for example). Also on the web page 400, some text is grayed-out; this may be done in the actual web user interface for options under items not currently selected, and is done on FIG. 4 as a convenient way of illustrating all available options whether selected or not.

In a section 410, a set of options are available for selecting one or more transactions for which the user wants to alter the display. The first decision the user must make is whether to select a single transaction or multiple transactions for display alteration. If only a single transaction alteration is desired (e.g., to hide a jewelry purchase), the user clicks the "Single transaction" radio button, clicks on "Select transaction", then selects a transaction from a transaction list read from a master database of transactions.

If alteration of multiple transactions is desired, the user clicks the "Multiple transactions" radio button, and is then presented with three different options for selecting the multiple transactions. In FIG. 4, the "All transactions from same merchant" radio button is selected, and after clicking on "Select merchant", the user selects a transaction involving the desired merchant from a transaction list. Other options for selecting multiple transactions include selecting transactions containing a user-specified text string (which may include wildcards—such as "coff*"), or manually selecting transactions from the online transaction list.

In a section 420, the user selects the type of alteration desired for the one or more transactions selected above in the section 410. Two different types of alteration are available—hiding the transaction(s), or renaming the transaction(s). These are mutually exclusive options, as indicated by the radio buttons. If "Hide transaction(s)" is selected, no further user input is needed. If "Rename transaction(s)" is selected, the user must define the new transaction description that he or she wants to use. When only a single transaction was selected in the section 410, the entry of the new description by the user is straightforward. When multiple transactions were selected in the section 410, the entry of the new description(s) by the user may be handled in any suitable and readily understandable manner—such as a single new description (e.g., "Coffee") for all of the transactions from the identified merchant, or individually-defined new descriptions for a list of manually selected transactions.

In a section 430, the user defines where the altered transaction description is to be used. The altered (hidden or renamed) transaction description could be used in monthly statements, in online transaction lists, or both. The possibility of selecting both statements and online transaction lists is indicated by the use of checkboxes. After defining all of the transaction display alteration parameters in the sections 410-430, the user clicks on "Apply" at 440 to apply the display alterations.

Other features related to altered transaction display—not shown on FIG. 4—may be provided in a straightforward manner that would be understood by those skilled in the art. For example, just as an option or command was available on an account screen for altering the display of transactions, so too would an option be available for canceling the altered transaction display. When the user selects alteration of transactions on statements, an option could be provided to regenerate a statement which was already generated, where the regenerated version of the statement would include the alterations as specified by the user. Additionally, when the user selects alteration of the display of transactions on online transaction lists, and more than one online banking user profile has access to the account in question, the altered display could be applied to all online banking user profiles except the profile for the user who specified the alterations. Altered transactions displayed in online transaction lists of the user profile who made the alteration would include a visual flag which indicates that the display has been altered and a feature (such as clicking or hovering over the flag) to display the original transaction description.

The transaction display alterations features, options and selections depicted on FIG. 4 provide a framework for a user to designate, in a simple and straightforward manner, certain transactions to be hidden or renamed. These features and capabilities may be used to accomplish a wide variety of different display alteration objectives that may be of interest to the user. Some specific examples of results are discussed below in connection with FIGS. 5 and 6.

FIG. 5 is a mock-up illustration of a transaction list portion of a monthly statement similar to that shown in FIG. 2, where transactions have been hidden and renamed on the statement, according to an embodiment of the present disclosure. A statement 510 in FIG. 5 is directly comparable to the statement 260 of FIG. 2. The statement 510 has the same statement period as the statement 260 of FIG. 2, and therefore includes the same set of transactions. However, on the statement 510, the display of some transactions has been altered using the techniques of the present disclosure and the type of user interaction depicted in FIG. 4.

Comparing the transaction description 520 on FIG. 5 to the transaction description 282 on FIG. 2, it can be seen that the user has specified that the description "LNER 039756623" be changed to "TRAIN TIX TO LONDON". This is an example where the user may have seen the original transaction description soon after the transaction posted in the online transaction list in her mobile app, and wanted to immediately rename that transaction to something recognizable before she forgot what the original description referred to. This is exemplary of many different scenarios where users may want to rename transactions, individually or in groups, to something more recognizable.

Referring to the transaction description 284 on FIG. 2, it can be seen that this transaction is missing from the statement 510 on FIG. 5. The transaction on 06/21 at THE BAR WINDSOR would have appeared in the position indicated by arrow 530 on FIG. 5. However, the user has specified that this transaction be hidden on the statement. This is an example where the user may not want someone else to know that he was at a bar, or even that he was in Windsor for that matter, and therefore wanted the statement 510 altered to hide the transaction. Again, many similar scenarios may be envisioned where a user wants one or more transactions to be hidden from statements. In this case, if the user visited THE BAR on several occasions when he was in Windsor, he would likely specify that all transactions from this merchant be hidden from statements.

Comparing the transaction description 540 on FIG. 5 to the transaction description 288 on FIG. 2, it can be seen that the user has specified that the description "VITO'S VINOS" be changed to "VITO'S CUCINA". This is exemplary of many different scenarios where users may want to rename certain transactions so that they appear plausible but are more acceptable in some way—such as sounding more like a restaurant than a drinking establishment.

Near the bottom of the statement 510, just above the Total, is an entry 550 described as "Other Transactions", with an amount of $57.65. This entry 550 is added to compensate for the hidden transaction discussed above. Because the purchase in the amount of $57.65 at THE BAR (on the statement 260) is not shown on the statement 510, the Other Transactions line item must be added so that the sum of all line items on the statement 510 adds up to the correct Total, that is, the same value as shown on the statement 260 of FIG. 2. If multiple transactions were hidden on the statement 510, the single line item Other Transactions could be used to account for all of the hidden transactions. Alternately, each hidden transaction on a statement could be replaced by its own "other" line near the bottom of the statement 510.

FIG. 6 is a mock-up illustration of the mobile device 300 depicting a transaction list portion of an account page similar to that shown in FIG. 3, where transactions have been hidden and renamed in the online transaction list, according to an embodiment of the present disclosure. An online transaction list 620 in FIG. 6 is directly comparable to the transaction list 320 of FIG. 3. However, in the transaction list 620, the display of some transactions has been altered (i.e., they have been hidden or renamed) using the techniques of the present disclosure and the type of user interaction depicted in FIG. 4.

Referring to the first transaction on the transaction list 320 of FIG. 3, it can be seen that this transaction is missing from the transaction list 620 of FIG. 6. The pending transaction at JAY'S JEWELRY would have appeared in the position indicated by arrow 630 on FIG. 6. However, the user has specified that this transaction be hidden from online transaction lists. This is an example where the user does not want someone else to know that the purchase was made at the jewelry store, to prevent a gift purchase from being unintentionally given away. In this case, knowing that the transaction display alteration feature was available in the digital banking system, the user accessed the mobile banking app immediately after making the purchase, and as soon as the jewelry purchase transaction appeared as pending in the online transaction lists, the user selected the transaction and designated that it be hidden from online transaction lists. The user may also have indicated that the same transaction be hidden from a future statement, in the manner shown on FIG. 4.

Referring to the last transaction on the transaction list 320 of FIG. 3, it can be seen that this transaction has been given a different description in the transaction list 620 of FIG. 6. The purchase at BURGER SHACK on the transaction list 320 corresponds with a transaction 640 on the transaction list 620. The transaction 640 has been modified as shown, with a new description HEALTH-FOODS-PLUS in box 642. This could be a case where a husband doesn't want his wife to know that he's cheating on his diet, so he has renamed the transaction to make it sound better. Many other similar scenarios may be envisioned.

The examples depicted in FIGS. 5 and 6 and discussed above are provided merely to illustrate how the hiding or renaming of transactions on statements and/or online transaction lists may be put to practical use by online banking system customers. FIGS. 5 and 6 also illustrate the types of actual display alteration outcomes that may be achieved by using the digital banking system features depicted in FIG. 4.

FIG. 7 is a flowchart diagram 700 of a method for altering the display of transactions in a transaction list, according to an embodiment of the present disclosure. At box 702, the user begins the transaction display alteration procedure using the user interface features shown on FIG. 4. At box 704, the system (web-based or app-based digital banking system) reads the original transaction data from a database 706. At box 708, the user selects one or more transactions for display alteration. As shown previously on FIG. 4, the user indicates whether a single transaction or multiple transactions are to be altered, and then selects transactions from the transaction list and/or specifies filters (e.g., text) to use in identifying transactions.

At box 710, the user indicates whether the selected transaction(s) are to be hidden or renamed. If the selected transaction(s) are to be renamed, the user also enters new description text at the box 710. At box 712, the user designates whether the altered (hidden or renamed) descriptions are to be applied in statements, online transaction lists or both. At box 714, the user applies the transaction display alteration parameters in the system to put the alterations into effect. The system then writes the user-specified transaction display attributes to the database 706 where they are stored as separate data fields which are related to the specified transactions but do not overwrite the original transaction data. The steps taken by the user and the system at the boxes 708 through 714 all correspond directly with the user interface dialog screen depicted on FIG. 4 and discussed earlier.

At box 720, the system begins the transaction display alteration procedure whenever a statement is generated or an online transaction list is displayed by a user in an online banking system. At box 722, the system reads the transaction data—including the original transaction data and the user-specified transaction display attributes—from the database 706. At decision diamond 724, it is determined whether the current action being taken by the system is a statement generation or an online transaction list display. At box 726, an altered statement is generated based on the user-specified display alterations (hiding or renaming certain transactions), if the user has specified that any transactions be altered on statements. At box 728, an altered online transaction list is displayed based on the user-specified display alterations (hiding or renaming certain transactions), if the user has specified that any transactions be altered in online transaction lists.

As mentioned earlier, other steps, not shown on FIG. 7, may be taken in relation to the alteration of the display of some transactions—such as canceling the previously-specified alteration of transactions.

The preceding discussion has been structured in terms of a single user and that user's accounts with the bank business. It is to be understood that all of the bank's customers have access to the display alteration features in the online banking systems, and that the display alteration attributes are correspondingly stored in relation to the appropriate customer, the specific account of that customer, the specific transactions within that account, etc., in a manner which would be understood by those familiar with transactional database systems.

It is to be understood that the method of FIG. 7, and the user interface features shown on FIG. 4, are programmed as one or more algorithm which runs on the computing system 206 (the enterprise server) cooperatively and interoperably with the computing device 104 and/or the mobile device 106 (or 300) of the customer. These devices all include processors, memory and communication modules suitable to run the algorithm and perform the digital banking transaction display modifications in the manner described throughout the present disclosure.

The method and system for transaction display alteration, discussed above, provides features which enable customers to customize if and how certain transactions are displayed, giving customers online banking features and flexibility which increase customer satisfaction and encourage customer usage of web-based or app-based digital banking systems, thereby promoting increased use of the digital systems. This increased customer satisfaction in turn leads to further growth of the bank business and its customer base.

Particular embodiments and features of the disclosed methods and systems have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for modifying a display of an item on a list, said system comprising:
   a user computing device; and
   a server computer with at least one processor and memory, said server computer being in communication with the user computing device and with a database containing data including a list of transactions, each of the transactions including a description field and other fields related to the transaction,
   where the server computer or the user computing device is configured with an algorithm performing steps including;
   reading the list of transactions from the database;
   selecting one or more transactions from the list of transactions, performed by a user using a graphical user interface (GUI) of the user computing device, including choosing an option from a list consisting of selecting a single individual transaction, selecting all transactions involving a particular merchant, selecting all transactions with a description including a user-defined text string, and manually selecting multiple transactions, and further including reconfiguring a display on the GUI to allow user selection based on the option chosen, where selected transactions are displayed on the GUI of the user computing device for confirmation by the user;

selecting a type of display modification of the one or more transactions, by the user;

defining where to apply the display modification of the one or more transactions, by the user;

writing data defining the display modification of the one or more transactions to the database upon confirmation by the user; and using the list of transactions and the data defining the display modification of the one or more transactions to create a modified list of transactions, where the modified list of transactions is used in an account statement or an online transaction list which includes a line listing a total amount of any transactions removed by the display modification.

2. The system according to claim 1 wherein the user computing device is a tablet device or a smart phone configured with a mobile application which communicates with the server computer.

3. The system according to claim 1 wherein the user computing device is a computer configured with a web browser application which communicates with the server computer.

4. The system according to claim 1 wherein the system is a digital banking system in which the user has access to and control of one or more accounts.

5. The system according to claim 1 wherein wildcards are permissible in the user-defined text string.

6. The system according to claim 1 wherein the type of display modification is removing the one or more transactions from the account statement or the online transaction list.

7. The system according to claim 1 wherein the type of display modification is renaming the transaction description for the one or more transactions on the account statement or the online transaction list, and selecting the type of display modification includes providing a modified transaction description for the one or more transactions.

8. The system according to claim 1 wherein defining where to apply the display modification of the one or more transactions includes applying the display modification in account statements, in online transaction lists, or both.

9. The system according to claim 8 wherein applying the display modification in account statements includes causing an account statement to be printed and mailed to the user.

10. The system according to claim 1 further comprising a user-selectable option to erase the data defining the display modification of the one or more transactions from the database.

11. A system for modifying a display of an item on a list, said system comprising:

a user computing device, including a computer running a web browser or a tablet or smart phone running a mobile application; and a server computer with at least one processor and memory, said server computer being in communication with the user computing device and with a database containing data including a list of transactions, each of the transactions including a description field and other fields related to the transaction, where the server computer or the user computing device is configured with an algorithm performing steps including;

reading the list of transactions from the database;

selecting one or more transactions from the list of transactions, performed by a user using a graphical user interface (GUI) of the user computing device, including selecting a single individual transaction or selecting a group of transactions having a common merchant or a common text string in the description field, or manually selecting multiple transactions, and further including reconfiguring a display on the GUI to allow user selection based on the option chosen, where selected transactions are displayed on the GUI of the user computing device for confirmation by the user;

selecting a type of display modification of the one or more transactions, by the user, including hiding the one or more transactions or renaming the description field of the one or more transactions;

defining where to apply the display modification of the one or more transactions, by the user, including applying the display modification in account statements, in online transaction lists, or both;

writing data defining the display modification of the one or more transactions to the database upon confirmation by the user; and using the list of transactions and the data defining the display modification of the one or more transactions to create a modified list of transactions, where the modified list of transactions is used in an account statement or an online transaction list which includes a line listing a total amount of any transactions removed by the display modification.

12. A method for modifying a display of an item on a list, said method being executed by a server computer interoperating with a user computing device, said method comprising:

reading a list of transactions from a database, by the server computer or the user computing device;

selecting one or more transactions from the list of transactions, performed by a user using a graphical user interface (GUI) of the user computing device, including choosing an option from a list consisting of selecting a single individual transaction, selecting all transactions involving a particular merchant, selecting all transactions with a description including a user-defined text string, and manually selecting multiple transactions, and further including reconfiguring a display on the GUI to allow user selection based on the option chosen, where selected transactions are displayed on the GUI of the user computing device for confirmation by the user;

selecting a type of display modification of the one or more transactions, by the user;

defining where to apply the display modification of the one or more transactions, by the user;

writing data defining the display modification of the one or more transactions to the database upon confirmation by the user; and using the list of transactions and the data defining the display modification of the one or more items to create a modified list of transactions, where the modified list of transactions is used in an account statement or an online transaction list which includes a line listing a total amount of any transactions removed by the display modification.

13. The method according to claim 12 wherein the user computing device is a tablet device or a smart phone configured with a mobile application which communicates with the server computer, or the user computing device is a computer configured with a web browser application which communicates with the server computer.

14. The method according to claim 12 wherein the method is incorporated into a digital banking system in which the user has access to and control of one or more accounts.

15. The method according to claim 12 wherein the type of display modification is removing the one or more transactions from the account statement or the online transaction list or renaming the transaction description for the one or more transactions on the account statement or the online transaction list.

16. The method according to claim 12 wherein defining where to apply the display modification of the one or more transactions includes applying the display modification in account statements, in online transaction lists, or both.

* * * * *